United States Patent [19]

Bibby et al.

[11] Patent Number: 5,791,852

[45] Date of Patent: Aug. 11, 1998

[54] STORAGE SYSTEM FOR AUTOMATICALLY STORING AND REMOVING DIES

[75] Inventors: Grant Roy Bibby, Milton; Jan Chmielowski, Guelph, both of Canada

[73] Assignee: Federal Business Development Bank, Toronto, Canada

[21] Appl. No.: 415,938

[22] Filed: Apr. 3, 1995

Related U.S. Application Data

[63] Continuation-in-part of Ser. No. 958,357, filed as PCT/CA91/00212, Jun. 14, 1991, abandoned.

[30] Foreign Application Priority Data

Jun. 15, 1990 [GB] United Kingdom .................. 9013438

[51] Int. Cl.[6] ............................................ B65G 1/04
[52] U.S. Cl. ........................ 414/278; 414/277; 414/280; 414/274
[58] Field of Search ........................ 414/277, 278, 414/280, 273, 274, 246, 661

[56] References Cited

U.S. PATENT DOCUMENTS

| | | | |
|---|---|---|---|
| 4,405,277 | 9/1983 | Burkner et al. | 414/222 |
| 4,492,504 | 1/1985 | Hainsworth | 414/278 X |
| 4,756,657 | 7/1988 | Kinney | 414/281 |
| 5,120,179 | 6/1992 | Henderson et al. | 414/278 |
| 5,190,427 | 3/1993 | Lai | 414/278 |
| 5,199,840 | 4/1993 | Castaldi et al. | 414/280 |
| 5,328,316 | 7/1994 | Hoffman | 414/661 X |
| 5,487,636 | 1/1996 | Mkrtchyan | 414/277 X |
| 5,556,246 | 9/1996 | Broshi | 414/278 |

Primary Examiner—Stephen Gordon
Attorney, Agent, or Firm—Daryl W. Schnurr

[57] ABSTRACT

A system for storing dies and the like has a plurality of die storage cells arranged vertically in two columns with an elevator mounted in between. The system can be interfaced with a press or other equipment by means of a bridge. The storage cells each have three rollers mounted therein to guide and transport the dies. The elevator has a lift table with ball rollers and V-rollers thereon. The V-rollers guide the die from side to side and the V-rollers guide the die from front to rear and vice-versa on the elevator. There is a ball screw on the elevator to push or pull the dies from side to side between the elevator and the storage cells. There is a one way rigid chain unit on the system to push or pull the dies from front to rear or vice-versa on the elevator to or from the system. In operating the system, two storage cells at an entry level are left vacant and a replacement die is retrieved from the system and placed in one of the two entry level storage cells to await the removal of an existing die from a press or other equipment. The existing die is placed in the remaining storage cell at the entry level. The replacement die is removed from the storage cell at the entry level and placed in the press or other equipment. Subsequently, the existing die is returned to its predetermined location in the system. In this manner, down time for the press or other equipment is kept to a minimum.

18 Claims, 14 Drawing Sheets

STORAGE SYSTEM FOR AUTOMATICALLY STORING AND REMOVING DIES

This is a continuation-in-part application of application Ser. No. 07/958,357, filed as PCT/CA91/00212, Jun. 14, 1991, which became abandoned on Apr. 28, 1995.

BACKGROUND OF THE INVENTION

1. Field of the Invention

This invention relates to a system for storing dies and the like and to a method of operation thereof and, in particular, to a system for storing dies and the like that can interface with presses and other equipment.

2. Description of the Prior Art

It is known to store dies on the floor or in racks along a wall and move the dies between the place of storage and the place of use by using a forklift or an overhead crane. The height of the storage rack is limited by the reach of the forklift. While forklifts with an extended reach are available, they are extremely expensive. Also, for safety reasons, it is not advisable to lift heavy dies in this manner. When overhead cranes are used, they are not designed to push and pull the dies in and out of storage racks but only to lift them.

Forklifts and cranes do not handle the dies smoothly and safely and increase the likelihood of the dies being damaged.

It is also known to have a die carrier which travels between a storage rack and a location where the die is to be utilized. The die carrier can vary in height but does not transport dies with sufficient efficiency or safety to have achieved widespread use.

Recently, with just-in-time manufacturing, it has become increasingly important to change dies or molds as quickly as possible. When dies or molds cannot be changed quickly enough, manufacturers must have long runs with a particular die or mold in place and will build up the inventory of that particular product as the product is being manufactured in a quantity much greater than the number of outstanding orders. That product must then be stored, further increasing the costs of the manufacturer. Where dies or molds can be changed quickly and efficiently, a manufacturer can use a die or mold to run the exact units of products required in a particular order. The die or mold can then be changed to do the same for another order. In this manner, dies or molds can be changed several times per day and inventory and storage space for inventory can be kept to an absolute minimum, thereby achieving large cost savings.

U.S. Pat. No. 4,756,657 describes a stacker bin shuttle for transferring containers to and from storage racks. A carriage is mounted on an elevator and carries a rod adopted to engage the flange on the container drawer to remove the drawer in and out of the storage rack.

Previous methods and systems for die or mold storage and changes are inadequate to meet the current just-in-time manufacturing requirements. Previous die storage systems have limited vertical height; or, they can only be used in conjunction with a particular type of equipment; or, they cannot be fully automated; or, they can only be used with light-weight dies or molds; or, they do not operate quickly enough to make the down time of a press or other machine with which they are used insignificant and thereby, to allow a user to change dies or molds several times per day while increasing the manufacturing efficiency rather than decreasing it; or, the system does not operate with sufficient accuracy to provide efficient results.

SUMMARY OF THE INVENTION

It is an object of the present invention to provide a system and a method of operation thereof for storing dies and the like and for removing dies from storage automatically and efficiently so that the down time of machinery used with the system becomes insignificant.

It is a further object of the present invention to provide a system and operation therefor for storing dies whereby the system is durable and operates with a high degree of accuracy and efficiency.

A system for storing dies and the like has a plurality of die storage cells arranged vertically in a column. An elevator is mounted adjacent to the column and each storage cell is sized to store a die and has a first guide means and transport means thereon so that a die can either be placed in or removed from each cell. The elevator has a front, a rear and two sides and is connected to move vertically relative to said column. The elevator has a lift table with second and third guide means and transport means thereon. The second guide means is arranged to move a die from side to side of said elevator. The third guide means is arranged to move a die from front to rear of said elevator. There are first transfer means to transfer a die from side to side along said second guide means to or from a storage cell. There are power means to move the elevator vertically and control means to store or remove a die on or from a particular storage cell and to receive or remove a die on or from said elevator. The column and elevator are a self-contained unit.

In a method of storing dies using a die storage system having a plurality of die storage cells arranged vertically in two columns with an elevator mounted between said columns, each storage cell is sized to store a die and has a first guide means and transport means thereon so that a die can either be placed in or removed from each cell. The elevator has a front, a rear and two sides and is connected to move vertically relative to said columns. The elevator has an upper surface and second and third guide means and transport means thereon. The second guide means is arranged to move a die from side to side of said elevator. The third guide means is arranged to move a die from front to rear of said elevator and vice-versa. There are first transfer means to transfer a die from side to side along said second guide means to or from a storage cell and second transfer means to transfer a die from front to rear along said third guide means and vice-versa. There are power means to move the elevator vertically and control means to store or remove a die on or from a particular storage cell. The columns and the elevator are a self-contained unit. The method is characterized by the steps of, commencing at a stage when an existing die is being returned to said storage system and a replacement die is being removed from said storage system to replace said existing die, the storage cells located at an entry level of said columns and one additional cell being empty, activating the control means to direct the elevator to retrieve a die from a particular storage cell, said elevator moving to a level of said storage cell, said first transfer means automatically being activated in gripping said replacement die to remove said die from said storage cell and to pull it onto said elevator, said elevator moving vertically to said entry level, said first transfer means being activated to push said replacement die into one of the two storage cells at said entry level, said second transfer means receiving the existing die and pulling it from front to rear onto said elevator, said first transfer means then transferring said existing die to the other storage cell located at said entry level, said first transfer means then removing the replacement die from said first storage cell at said entry level and pulling it onto said elevator, said second transfer means being activated to remove said replacement die from said elevator from a rear to a front of said elevator so that said die leaves said system, said first transfer means then removing the existing die from said second storage cell at said entry level and pulling said existing die onto said elevator, said elevator moving vertically to a level of the desired storage cell for the existing die, said first transfer means pushing said existing die into said storage cell, the two storage cells at said entry level then being vacant.

DESCRIPTION OF A PREFERRED EMBODIMENT

Figure 1:
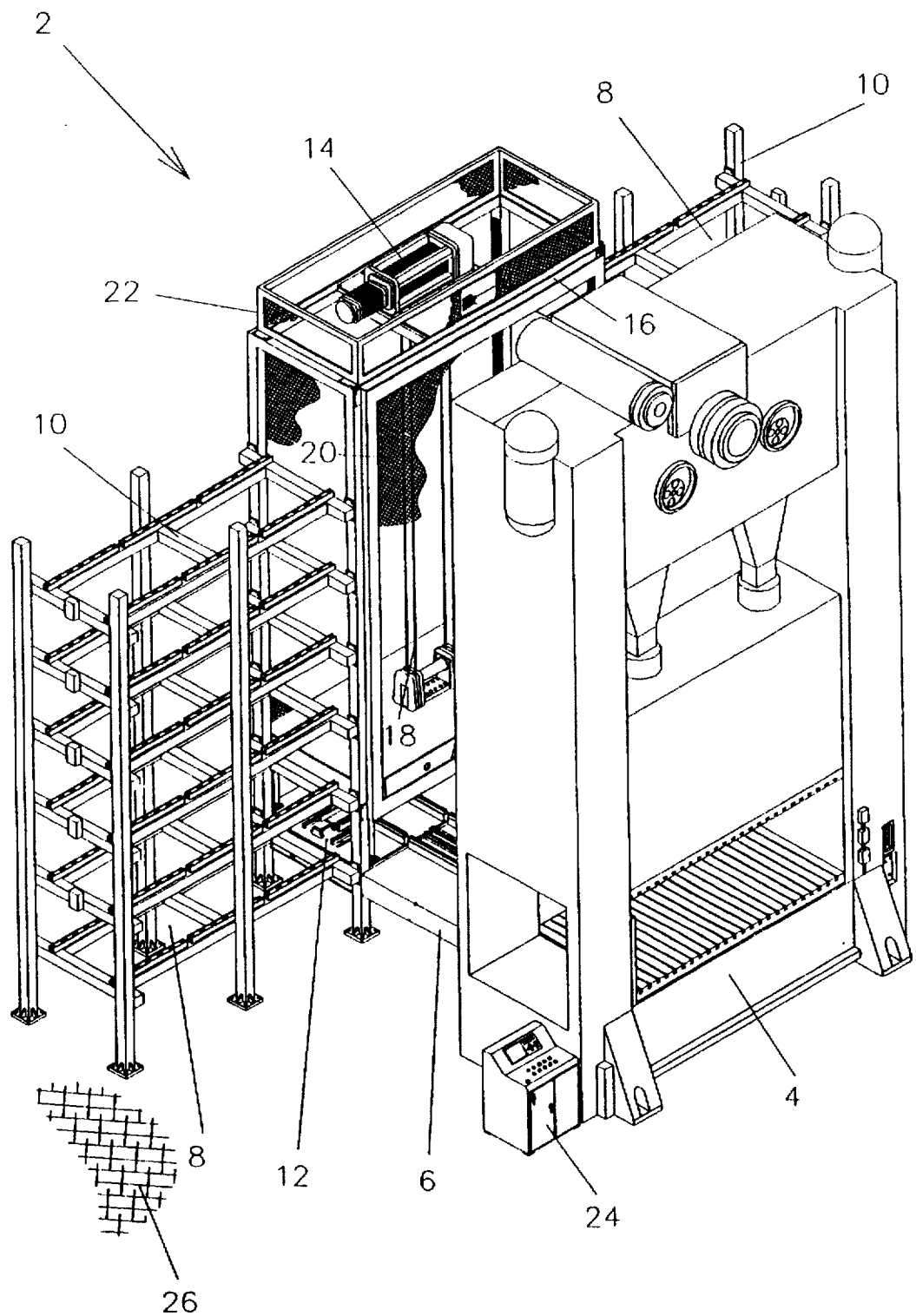
FIG. 1 is a perspective view of a press, bridge and self-contained storage unit.

In FIG. 1, there is shown a system 2 for storing dies and the like which is connected to a press 4 by means of a bridge 6. A plurality of die storage cells 8 are arranged vertically in two columns 10. Between the two columns 10, there is located an elevator 12 which can move vertically relative to the columns through operation of the power means or motor 14 supported on a frame 16 and the cables 18. A safety screen 20 (only part of which is shown) is located at a front and rear of the frame 16. Another screen 22 (only part of which is shown) surrounds the motor 14. Control means 24 for the press 4 can be connected as control means for the storage system 2 as well. Usually, the storage system 2 will have separate control means from those of the press with part of the control means of the press and storage system being interfaced with one another. While the storage system 2 is shown as being connected to a press via a bridge, the storage system is a self-contained unit and could be used independently of any other equipment or could be connected to equipment that is similar to a press in that it requires one component to be changed continually. For example, the storage system could be connected to a mold machine where the molds are being constantly interchanged. The system 2, the press 4 and the bridge 6 are securely mounted on a supporting surface 26. The press is conventional and need not be further described.

Figure 2:
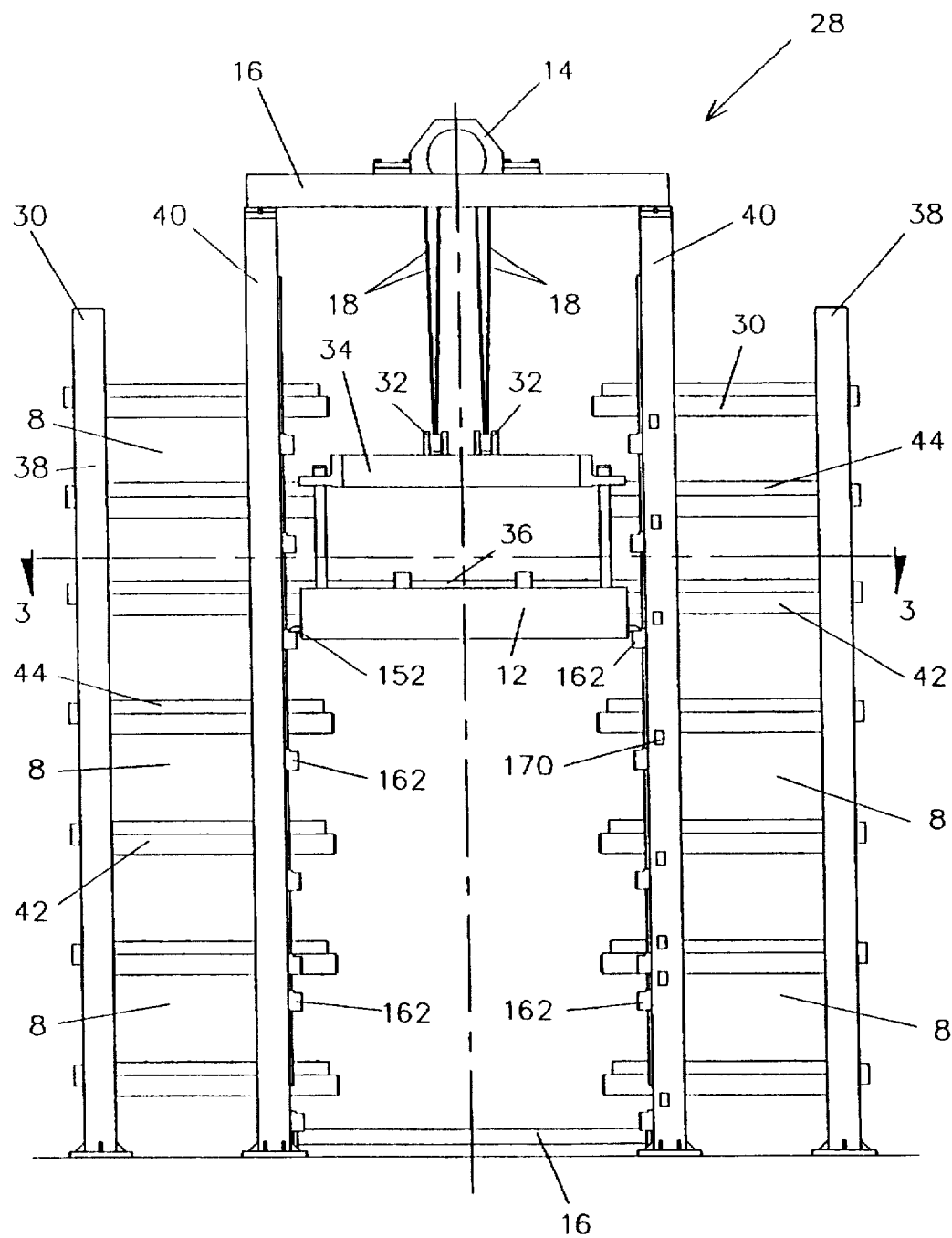
FIG. 2 is a front view of a further embodiment of a self-contained storage unit having two columns and an elevator.

In FIG. 2, there is shown a front view of a system 28 for storing dies and the like. The system 28 has an elevator 12 mounted between two columns 30. The system 28 is virtually identical to the system 2 except for the cross-sectional shape of the columns 30. When compared to the columns 10, the columns 30, when viewed from the front, are wider and have fewer vertical supports than the columns 10. It can be seen that the cable 18 extends between a motor 14 mounted on a frame 16 and pulleys 32 mounted on a top 34 of the elevator 12. The elevator 12 has a lift table 36 thereon. The columns 30 each have four vertical pillars 38, 40 (only two of which are shown in FIG. 2). The two pillars 40 on each column 30 are interior pillars and also serve to support the frame 16 at a top and bottom of the pillars. The pillars 38 of each column 30 are exterior pillars. Cross-members 42 extend horizontally between the pillars 38, 40 of each column, each cross-member defining a separate storage cell 8. On top of each of the cross-members 42 are first guide means and transport means 44.

Figure 3:
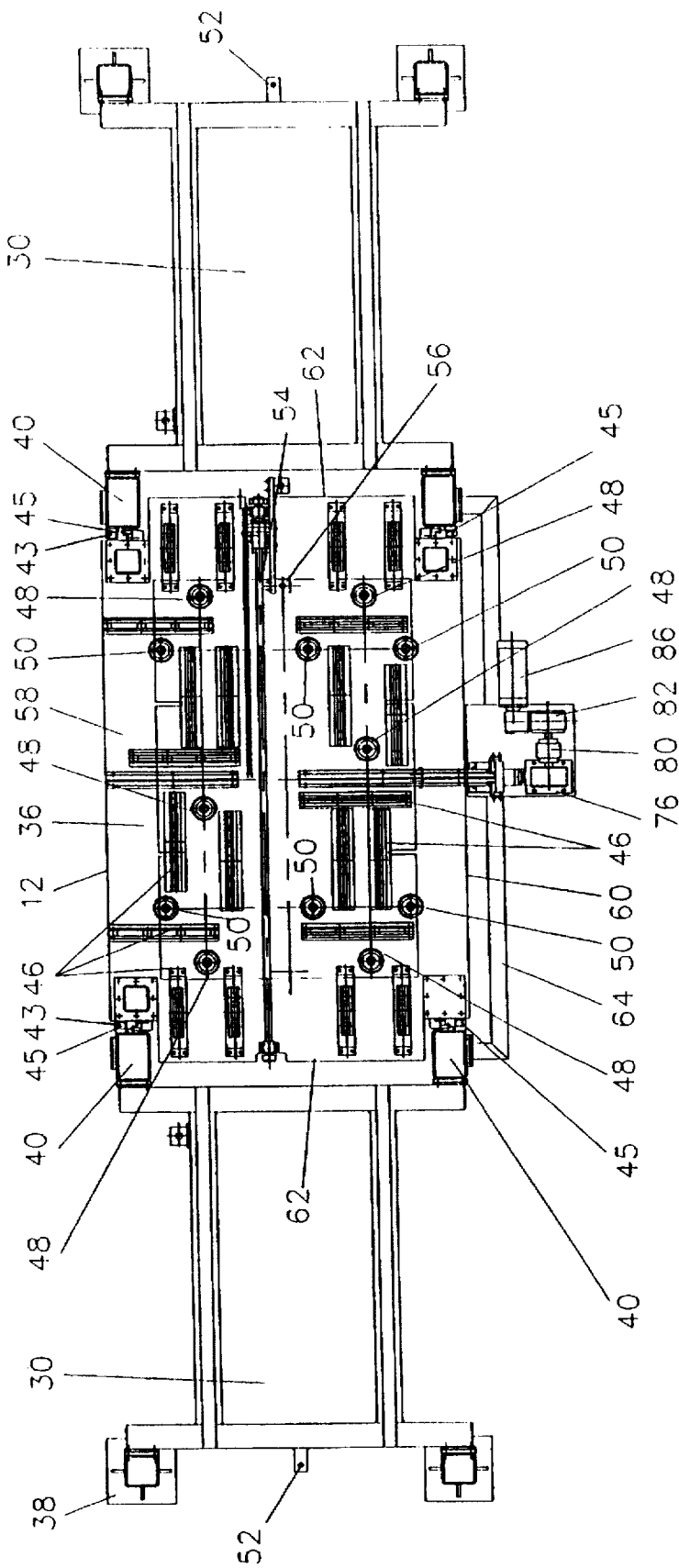
FIG. 3 is a sectional view of the self-contained storage unit along the lines 3—3 of FIG. 2.

In FIG. 3, there is shown a sectional top view of the system 28 of FIG. 2 along the lines 3—3 of FIG. 2. At each of the four corners of the elevator 12, there are preferably mounted in brackets 43 two cam followers 45 which rotate against the interior pillars 40 of the two storage columns 30 to provide a vertical guiding mechanism. Preferably, a machined steel plate lines each pillar and the cam followers rotate thereon. The lift table 36 contains a plurality of ball rollers 46 which permit rolling in any direction and support a die (not shown) on the lift table. In addition to the ball rollers 46, there is a first set of six V-rollers 48 that are mounted to guide the die (not shown) from side to side. In addition, there is a second set of six V-rollers 50 which are mounted to guide the die (not shown) from front to rear and vice-versa on the lift table 36. The combination of the V-rollers 48 and the ball rollers 46 provide second guide means and transport means for the die (not shown) on the elevator 12. The combination of the V-rollers 50 and the ball rollers 46 provide third guide means and transport means for the die (not shown) on the elevator 12. While the use of V-rollers as guide means is preferred, it would be possible to use other guide means for the die, for example, a series of abutments as guide means. The V-rollers 48, 50 on the elevator also function as transport means. The V-rollers 48 are connected so that they will move vertically between an extended upward position and a retracted downward position either pneumatically or hydraulically. Similarly, the V-rollers 50 are connected so that they will move between an extended and retracted position pneumatically or hydraulically. When the V-rollers 48 are extended and the V-rollers 50 are retracted, the die (not shown) will be permitted to move from side to side on the elevator 12. Similarly, when the V-rollers 50 are extended and the V-rollers 48 are retracted, the die (not shown) will be permitted to move from front to rear and vice-versa on the elevator 12. The six V-rollers 48 are said to comprise a set of V-rollers and the six V-rollers 50 are said to provide another set of V-rollers. When both sets of V-rollers 48, 50 are extended and there is a die (not shown) on the lift table 36, the die will be locked in position and will not be able to move in either direction. While there is no die shown in FIG. 3, the die would have Y-grooves in its base or subplate and the V-rollers would be positioned to be located in at least one of said Y-grooves when the V-rollers are in an extended position. While the extended V-rollers provide some support for the die, the main support is provided by the ball rollers 46.

The first guide means and transport means 44 of the storage cells 8 are V-rollers that are oriented to move the die (not shown) to or from the elevator 12. A mechanical stop 52 is positioned in each storage cell 8 to prevent the die (not shown) from inadvertently rolling out of the cell. In conjunction with the two columns 30, the elevator 12 has a first transfer means 54, which is one ball-screw. The ball screw moves a die (not shown) on the elevator 12 to and from either one of the columns 30. The ball screw has gripping means 56 for the die, for example, air cylinders. The V-rollers 44 provide guide means and some support for the die (not shown).

The elevator 12 has a front 58, a rear 60 and two sides 62. Affixed to the interior pillars 40 at the rear 60 of the elevator 12 is a support 64. The support 64 extends adjacent to the rear 60 of the elevator 12 beneath a second transfer means 66 which is best shown in FIGS. 3 and 5.

Figure 4:
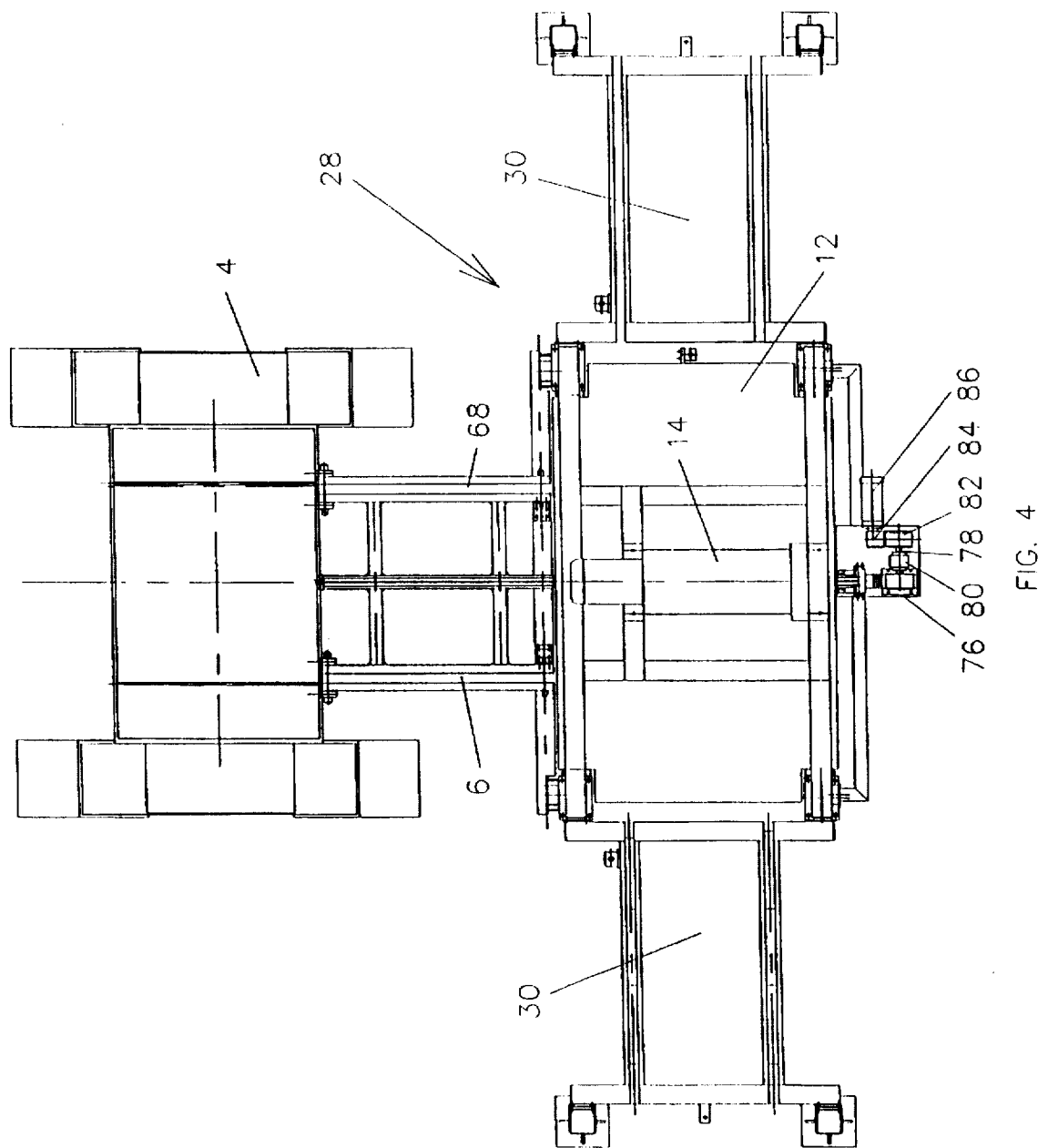
FIG. 4 is a top view of a press, bridge and self-contained storage unit.

In FIG. 4, there is shown a top view of the system 28 connected to a press 4 by a bridge 6. It can be seen that the bridge 6 has fourth guide means and transport means 68 thereon so that a die can be transferred between said elevator 12 and said press 4 along said bridge 6. Preferably, the guide means and transport means 68 are V-rollers that are mounted in a manner similar to the V-rollers of the first guide means and transport means 44.

Figure 5:
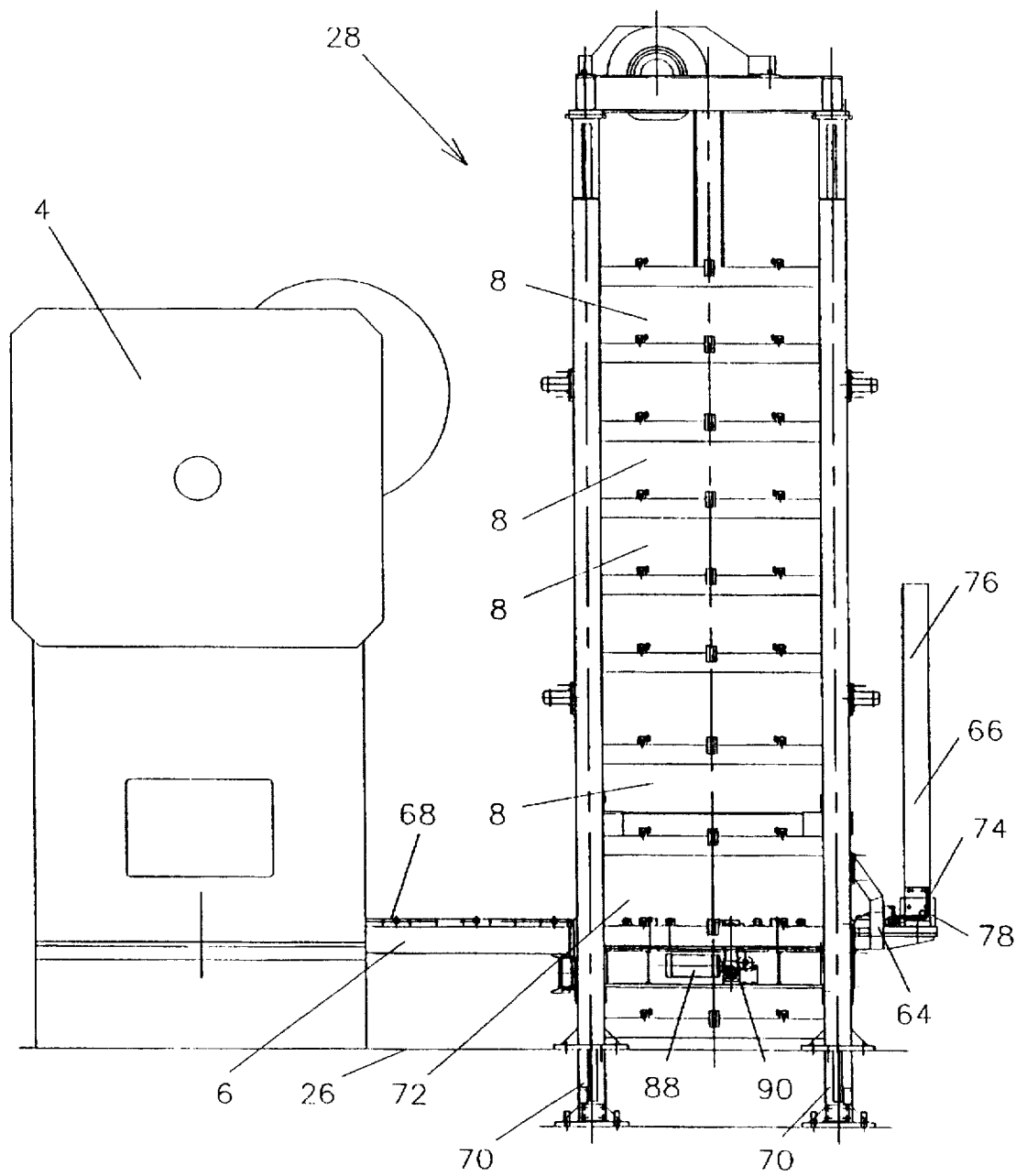
FIG. 5 is a side view of the press, bridge and self-contained storage unit of FIG. 4.

In FIG. 5, there is shown a side view of the press 4, bridge 6 and storage system 28. It can be seen that the storage system 28 is embedded in the supporting surface 26 by supports 70. It can also be seen that the lowermost storage cell 8 is located at an entry level 72. The entry level 72 could be any reasonable level of any of the storage cells 8 but it is preferably the level of the column 30 at which it is most convenient to insert or withdraw a die or the like (not shown). The entry level 72 is also the level at which the bridge 6 is located. The second transfer means 66 is located at the entry level 72. The second transfer means 66 is a snake chain system including a chain 74 that can be stored within a housing 76.

As can be seen from FIGS. 3, 4 and 5, the chain 74 is connected to a shaft 78 which extends into the housing 76 and is mounted in a bearing 80. The shaft 78 extends through the bearing 80 to a gear 82 which is meshed with a gear 84. The gear 84 is mounted on a shaft (not shown) of a motor 86. Preferably, the motor 86 is a one-half to one horsepower DC motor. The motor 86 is connected to the control means 24 and is reversible. The snake chain 74 is designed so that it will bend in only one direction. The chain 74 can therefore be used to push a die across the bridge to a press or other equipment. When the motor 86 is activated so that the chain 74 drives almost entirely within the housing 76, the chain 74 can be said to be retracted. From this position, if there is a die (not shown) located on the elevator 12 at the entry level 72, the motor 86 can be activated to cause the chain to be moved out of the housing 76 towards the bridge 6 and press 4. As the motor continues to rotate in the same direction, the chain will contact the die (not shown) and push it along the extended V-rollers 50 of the elevator 12 and the V-rollers 68 on the bridge 6 into the press 4. In an opposite manner, the motor 86 can be activated to retract the chain 74 thereby withdrawing a die from the press 4 across the bridge 6 and onto the elevator 12. The second transfer means 66 is not required to be mounted on the system 28 if there is already a suitable transfer means for the die on the press 4. Beneath the lift table 36, there is mounted a motor 88 and gears 90 to operate the first transfer means 54 on the elevator 12.

Figure 6:
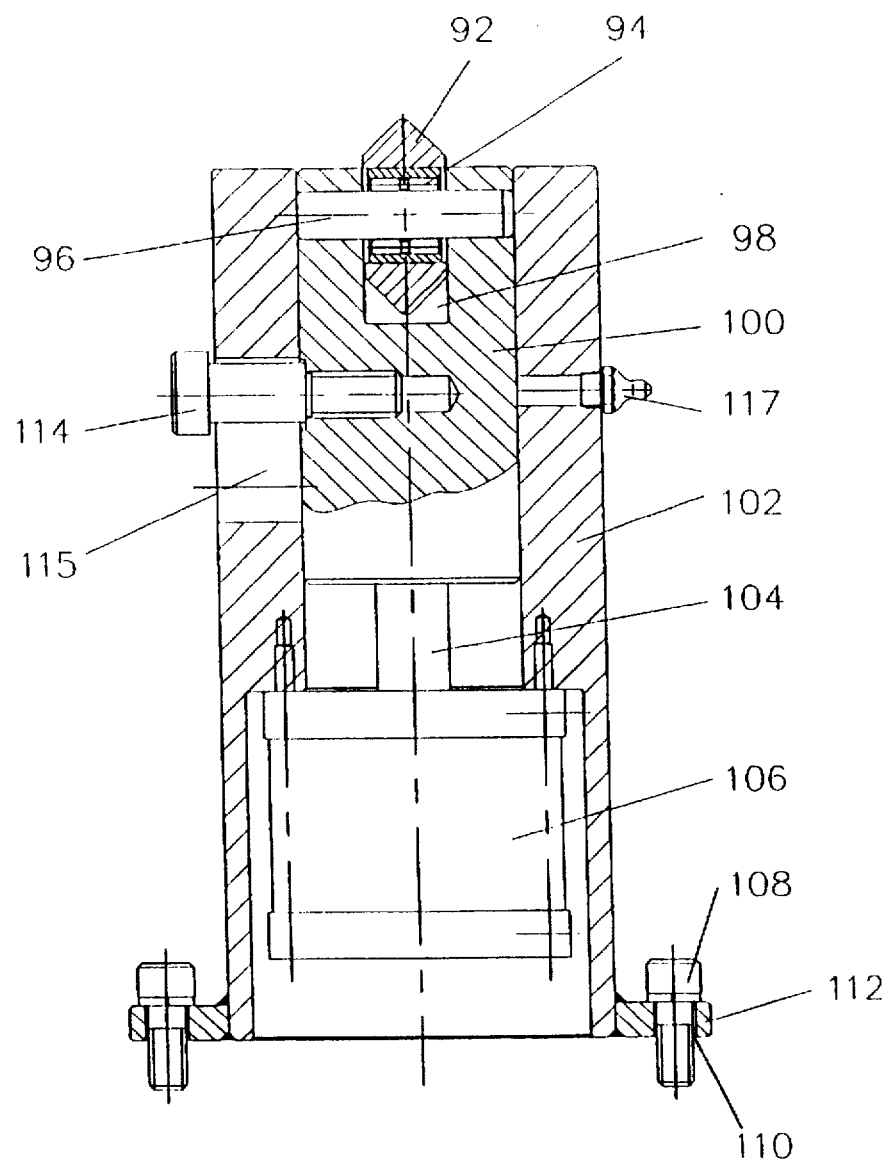
FIG. 6 is a sectional view of one embodiment of a V-roller mounting.

In FIG. 6, there is shown a partial sectional side view of a mounting for V-roller 92. The mounting for the V-roller 92 is the mounting used for the V-rollers 48, 50. As can be seen, the V-roller 92 has a bearing 94 which is rotatably mounted on a pin 96 within a U-shaped channel 98 in a plunger 100. The plunger 100 is slidably mounted within a housing 102 and is connected by a rod 104 to a piston (not shown) in a pneumatic or hydraulic cylinder 106. The housing is secured to a supporting surface by bolts 108 extending through a suitable opening 110 in a flange 112.

The plunger 100 contains a suitable opening (not shown) for pin 114. The pin 114 extends through a slot 115 in a wall of the housing 102 and into the plunger 100. The pin 114 provides extended and retracted limits for the movement of the plunger 100. The plunger 100 and the V-roller 92 are in the extended upward position shown in FIG. 6. When it is desired to move the V-roller 92 to the retracted downward position (not shown), the piston (not shown) in the cylinder 106 is pneumatically or hydraulically operated to retract the plunger 100. A grease nipple 117 is located in the wall of the housing 102.

Figure 7:
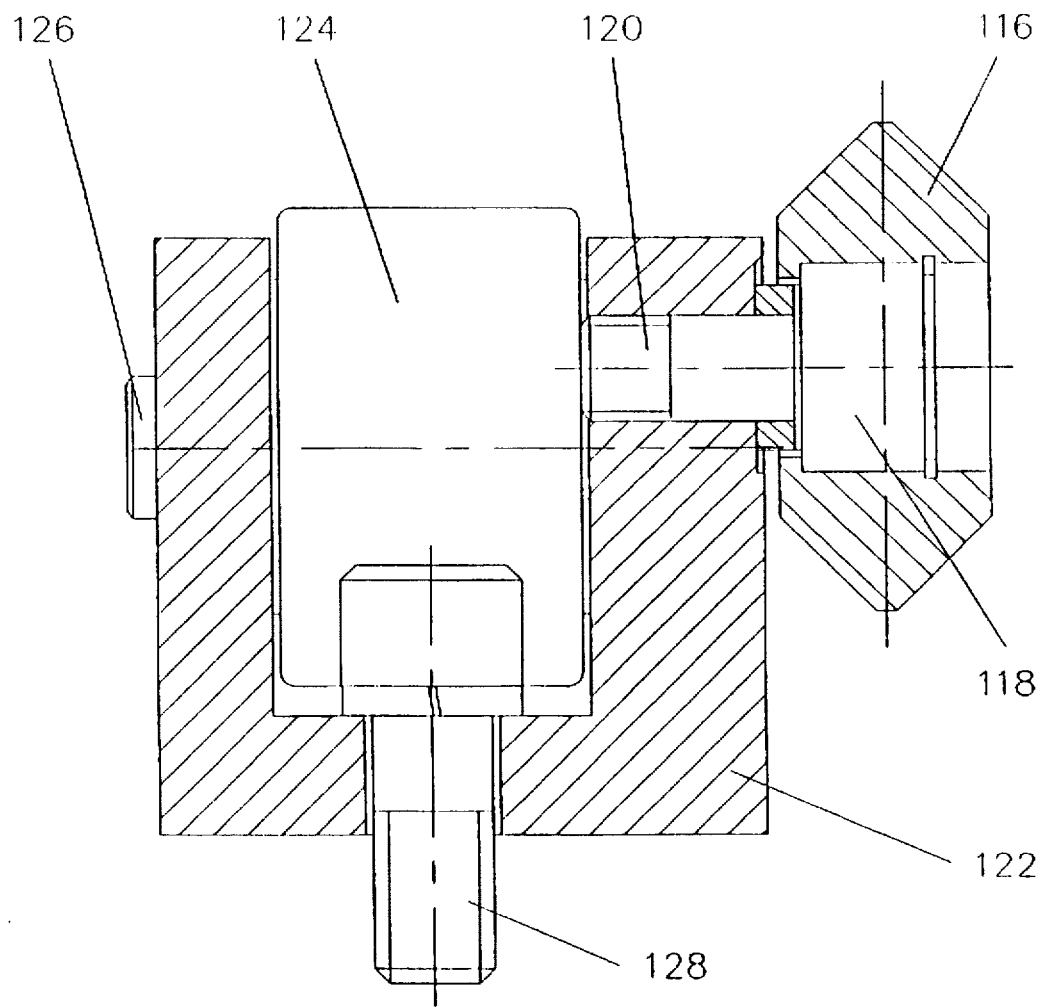
FIG. 7 is a sectional view of another embodiment of a V-roller mounting.
Figure 8:
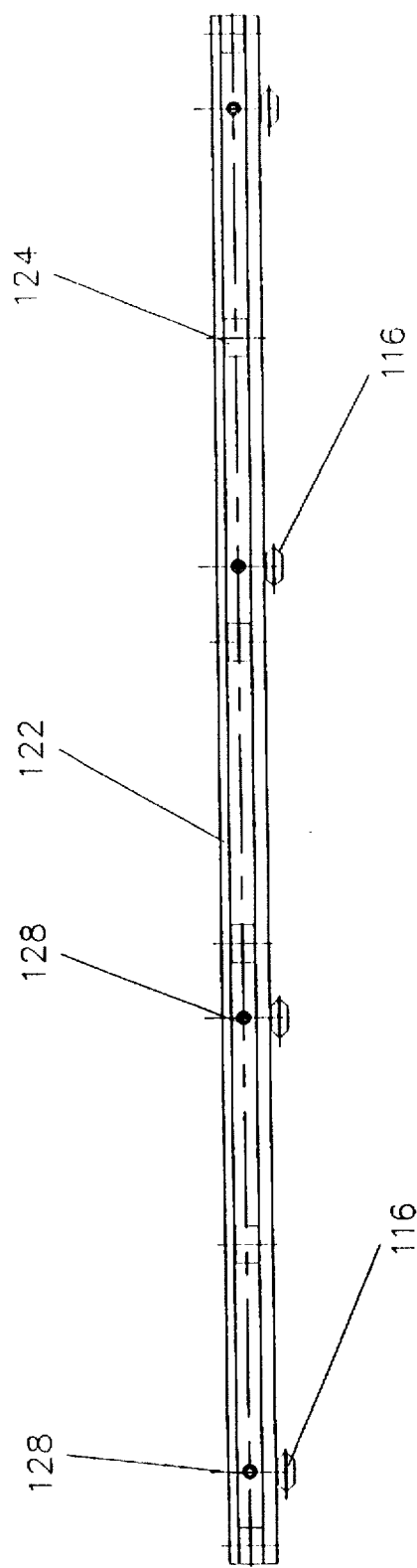
FIG. 8 is a top view of the mounting of FIG. 7.

In FIG. 7, there is shown a partial sectional side view of a V-roller 116 of the type that is preferably used as the first guide means and transport means 44 in each of the storage cells 8. The same type of roller 116 is also preferably used as the fourth guide means and transport means 68 on the bridge 6. A top view of this mounting is shown in FIG. 8. The V-roller 116 is rotatably mounted on a pin 118, which is rigidly mounted in an opening 120 in an elongated channel 122. A roller 124 is rotatably mounted on a pin 126 within the elongated channel 122. From FIG. 8, it can be seen that there are several rollers 116, 124 along the channel 122. Bolts 128 affix the channel 122 to a supporting surface (not shown). For example, when the roller 116 is used in a storage cell 8, the supporting surface is a cross-member 42 of one of the columns 30 and there will be one channel 122 along each cross-member. The rollers 124 support the weight of the die and the like while the V-rollers 116 provide some support but mainly provide guide means by rotating in a Y-groove of a die (not shown). In addition, the V-roller 116 and the channel 122 could be used on the bridge 6.

Figure 9:
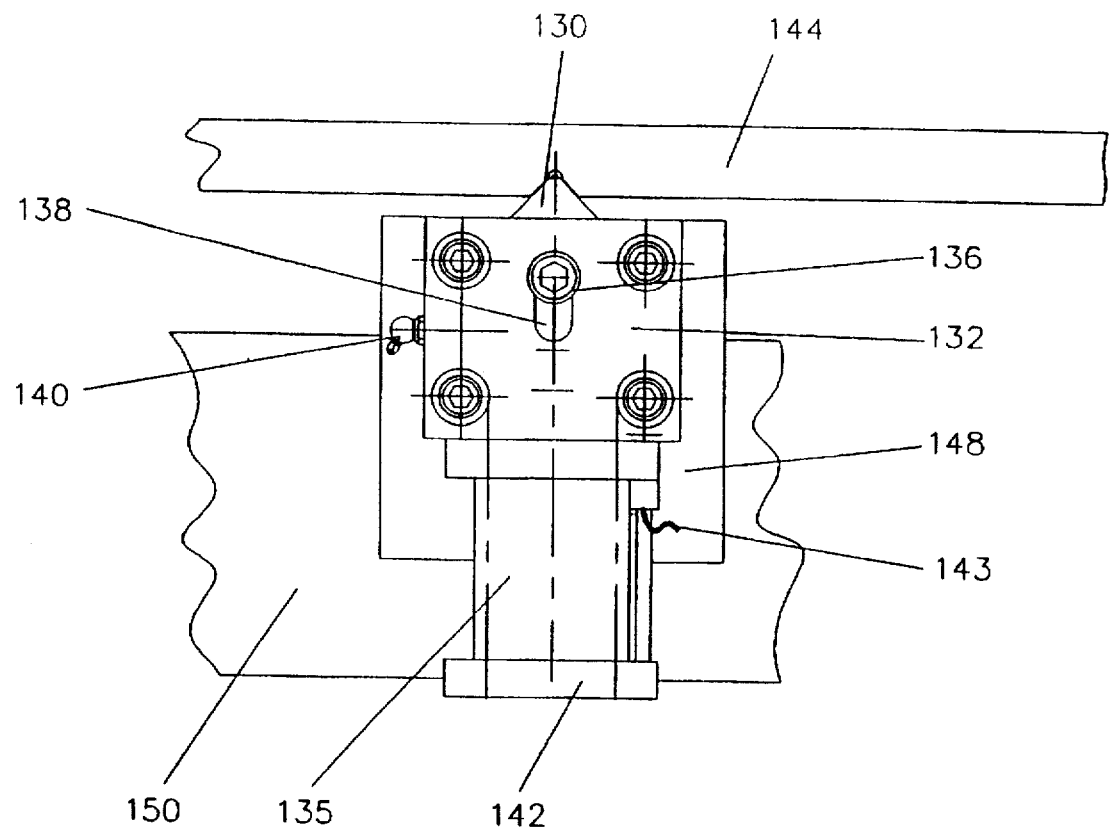
FIG. 9 is a front sectional view of a wedge pin.

In FIG. 9, there is shown a front view of a pneumatically operated wedge pin 130. The wedge pin 130 is slidably mounted within a housing 132 and is connected to a rod 134 (not shown in FIG. 9) so that the pin 130 can be extended to the position shown in FIG. 9 or retracted (not shown) by moving downward. The rod extends into a pneumatic cylinder 135. When the pin 130 moves downward to the retracted position (not shown), a bolt 136 in the pin 130 will slide downward in a slot 138 in the housing 132. The pneumatic cylinder has a grease nipple 140 and a base 142. The pin 130 is operated pneumatically at a connection 143. In the extended position shown in FIG. 9, the pin 130 extends into a Y-groove (not shown) in a subplate of a die 144. For dies that do not have a subplate, the Y-groove (not shown) is located directly in a base of the die.

Figure 10:
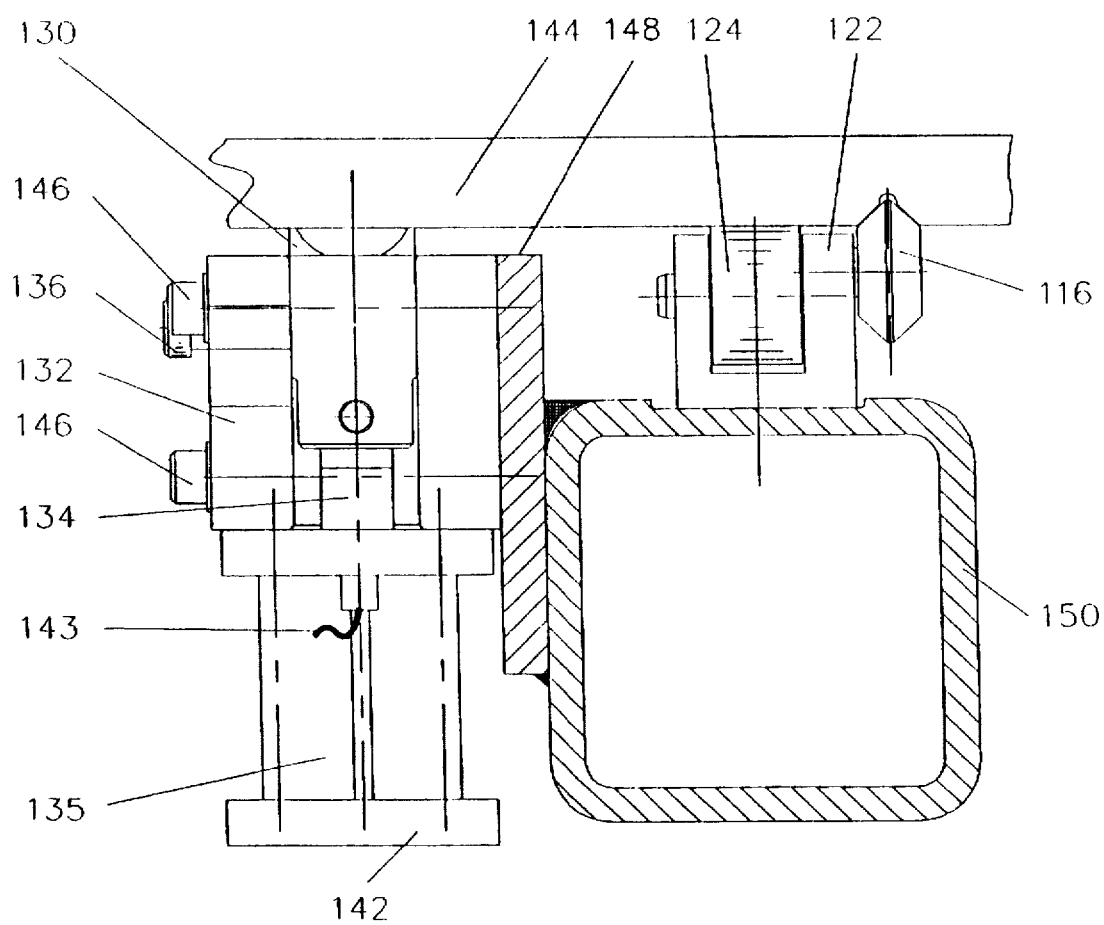
FIG. 10 is a sectional side view of a wedge pin.

In FIG. 10, a side view of the wedge pin 130 is shown. It can be seen that bolts 146 extend through a front of the housing 132 and into an anchor plate 148, which, in turn, is welded to a square bar 150 which also supports the elongated channel 122 for the V-rollers 116. It can be seen that the V-rollers 116 are also located in a Y-groove (not shown) of the subplate of the die 144.

When the die is in the process of being moved into or out of a storage cell 8, the wedge pin 130 is in a retracted position. When the die occupies a storage cell 8, the wedge pin 130 is extended to the position shown in FIG. 9 to lock the die in position within the storage cell.

Figure 11:
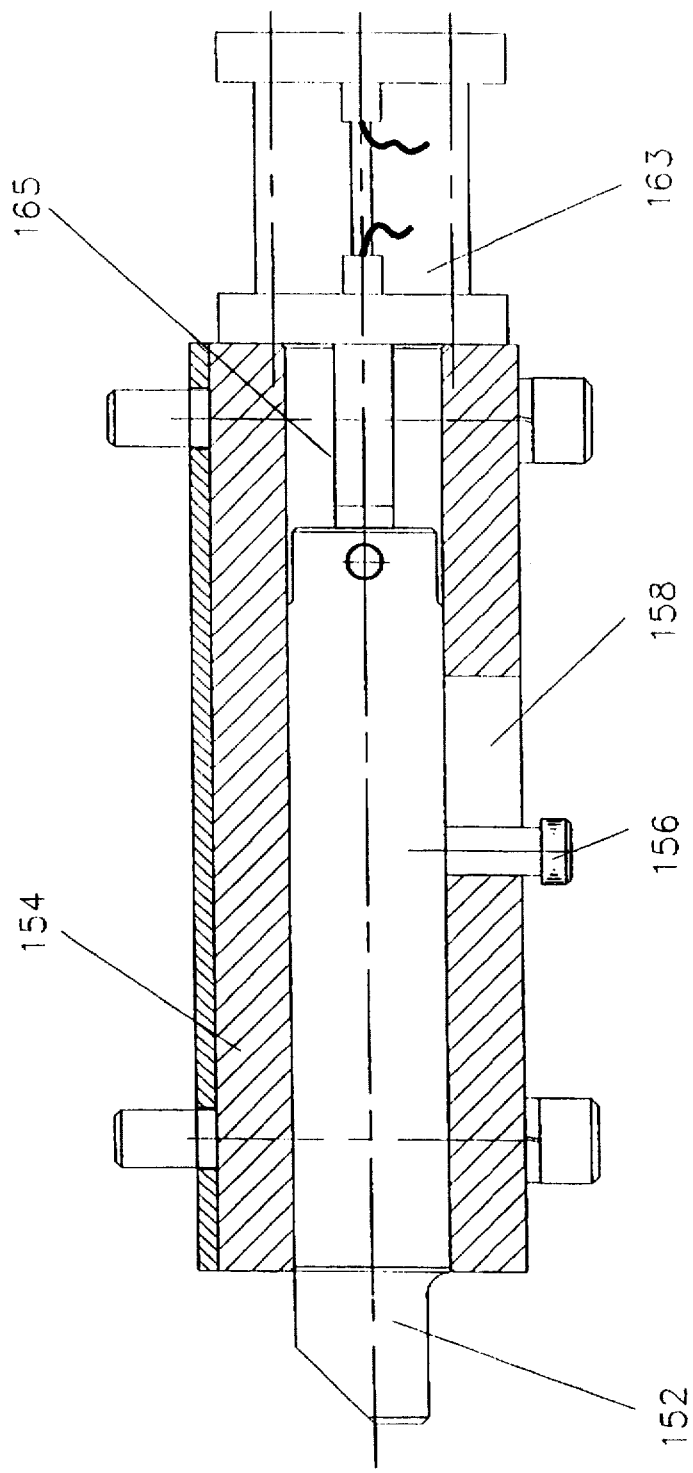
FIG. 11 is an elongated sectional side view of a corner pin on the elevator.
Figure 12:
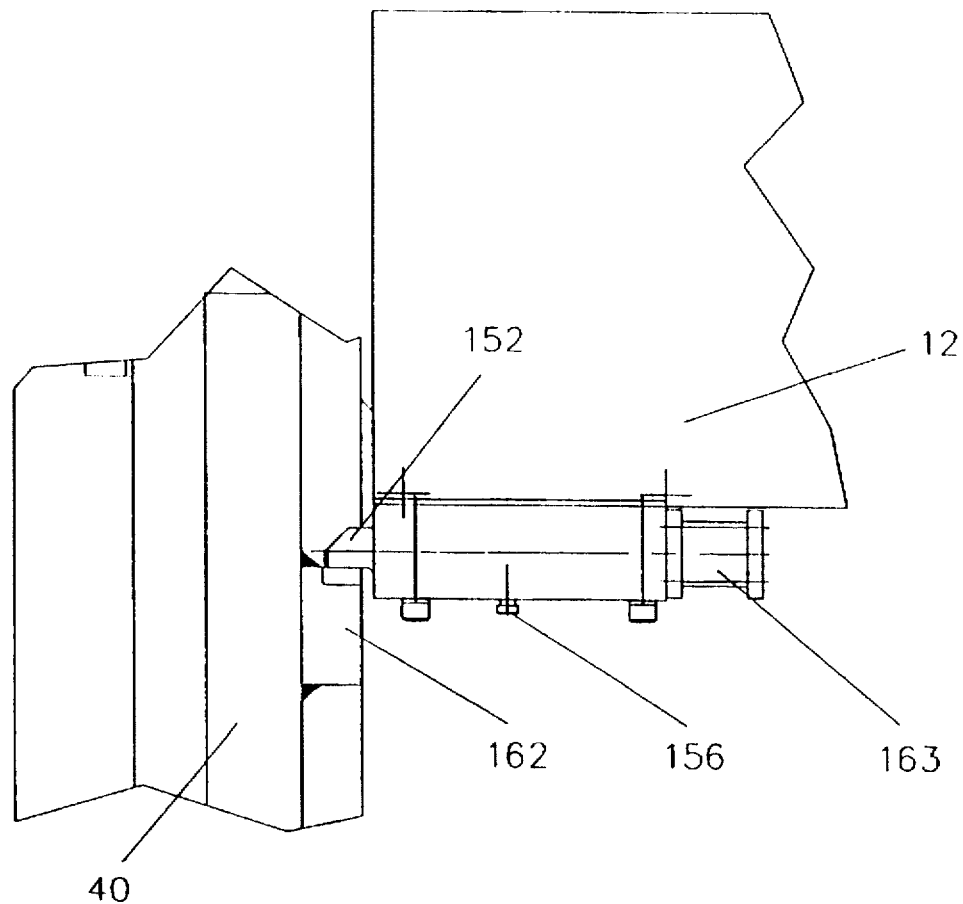
FIG. 12 is a partial view of a pin on an elevator engaged with a bracket on a pillar.

In FIG. 11, there is shown a retention pin 152 which is mounted in a housing assembly 154. As can be seen, the pin 152 is pneumatically controlled to extend to the position shown in FIG. 11 or to retract back into the housing. An abutment 156 moves within slot 158 to limit movement of the pin at the appropriate position. There is one pin located at each lower corner of the elevator 12 as can best be seen from FIGS. 2 and 12. The interior pillars 40 of the columns 30 have brackets 162 thereon (see FIGS. 2 and 12). The brackets 162 are located so that when the pins 152 are extended and the elevator is lowered, the four corner pins will abut the brackets 162. In other words, the elevator will not be able to proceed past the brackets 162. The brackets and pins are precisely positioned relative to one another so that when the pins abut the brackets at a particular storage cell, an upper surface of the lift table 36 is flush with an upper surface of the two storage cells located on either side of the elevator in that position so that a die can be removed from the elevator to a storage cell or vice-versa. The pin 152 is connected to a pneumatic cylinder 163 at a pneumatic connection 165.

Figure 13:
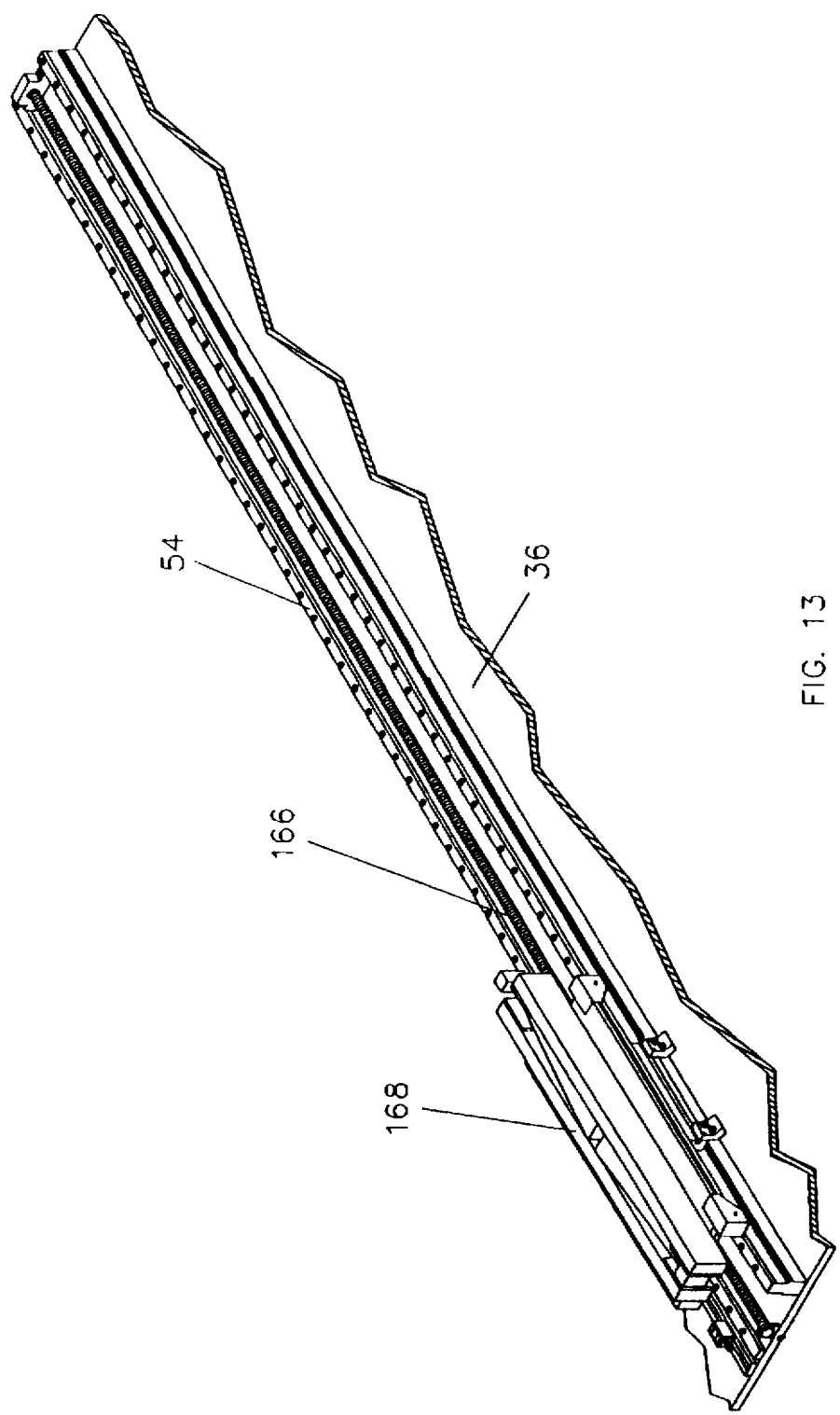
FIG. 13 is a perspective view of a ball screw transfer mechanism on the elevator.

In FIG. 13, there is shown a perspective view of the first transfer means 54 on the elevator 12. The first transfer means 54 is driven by a motor 88 and gears 90 (see FIG. 5). The motor 88 and the gears 90 rotate a ball screw 166 which in turn causes a gripper means 168 to move horizontally along the screw. The gripper means will move in either direction depending on the direction of rotation of the ball screw 166. The direction of rotation of the ball screw 166 is controlled by the direction of rotation of the motor 88, which is reversible. The gripper means 168 is preferably controlled by an air cylinder so that a pin in the gripper means can be inserted into a suitable opening in a die (not shown). The gripper means has a finger that can be activated by an air cylinder to rise up into a suitable opening in a die (not shown). The gripper means is conventional and the gripper can then push or pull the die to the desired position. The first transfer means 166 is used to transfer a die from side to side on the elevator 12 and into or out of a storage cell 8 on either side of the elevator.

Figure 14:
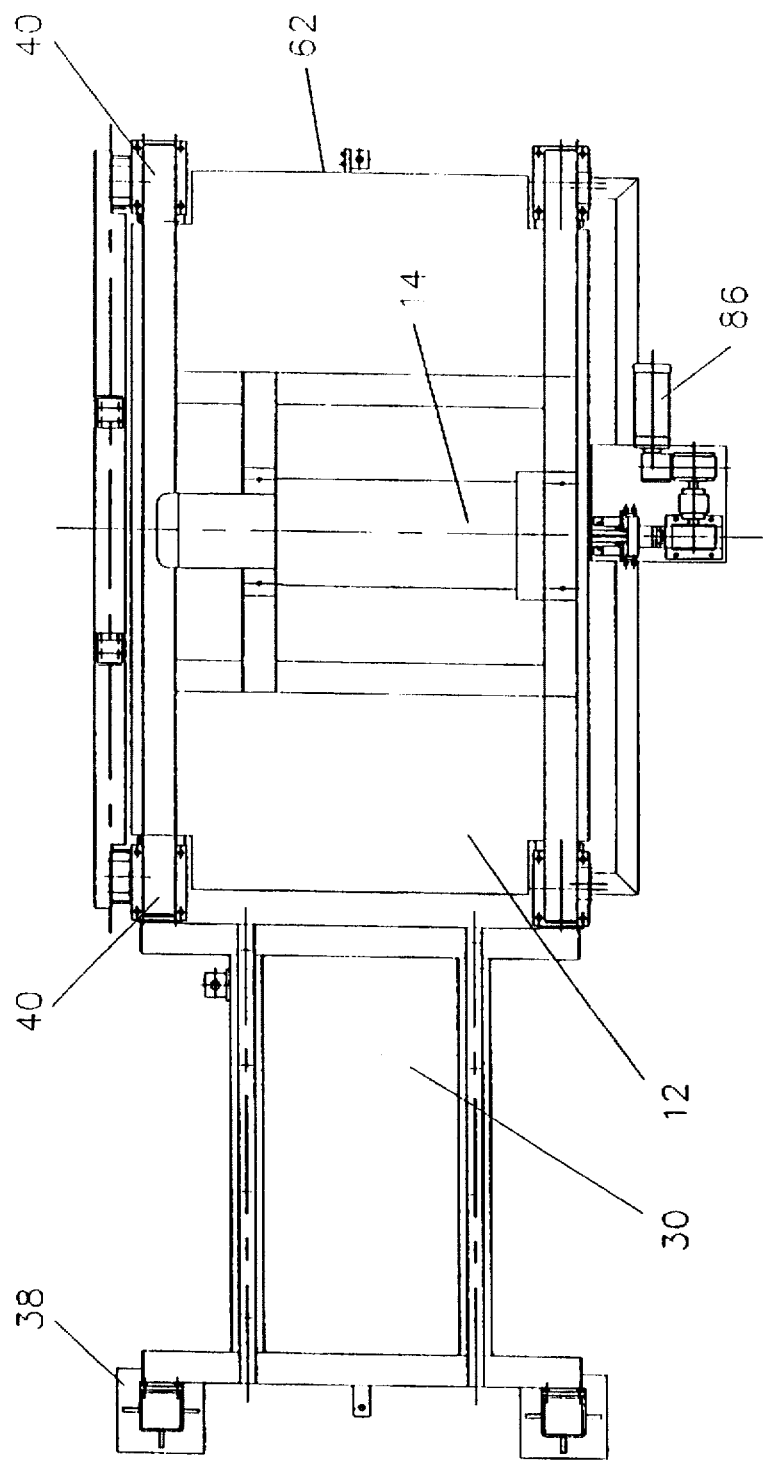
FIG. 14 is a top view of an elevator and one storage column.

In FIG. 14, there is shown a top view of an elevator 12 located adjacent to one column 30. Additional pillars 40, of course must be located on the side 62 of the elevator 12 away from the column 30.

In operation of the storage system as shown in FIGS. 2, 3, 4 and 5, the storage cells 8 at an entry level 72 as well as one additional cell are initially vacant. The remaining storage cells can be completely filled so long as there is one additional cell that is vacant. Commencing at a position where the press contains a die and it is desired to exchange that existing die for a replacement die that is stored in one of the storage cells other than an entry storage cell. While the press is still operating with the existing die, the control means of the storage system is operated to direct the elevator to retrieve the replacement die from the appropriate storage cell where it is located and to bring the die to the entry level and place it in either one of the vacant storage cells at the entry level. The storage system then waits until the press is ready to be shut down. When that occurs, the second transfer mechanism 66 is activated to extend the snake chain 74 into the press and to retrieve the existing die and pull it onto the elevator 12. To save time the chain can be partially extended towards the press while the press is still operating. As soon as the die is on the elevator 12, the first transfer means is activated to move the existing die into the other storage cell at the entry level that is still vacant. Simultaneously, the transfer mechanism retrieves the replacement die from the occupied storage cell at the entry level and places it on the elevator. The second transfer means 66 is then reactivated by extending the chain 74 to push the replacement die into the press 4. The press can then resume operation while the second transfer means is retracted. Then the first transfer means on the elevator is activated to retrieve the existing die from the storage cell at the entry level and return it to its predesignated storage cell within either of the columns 30. In this manner, the down time of the press is kept to a minimum.

Even if a press is not used with the storage system, the same procedure will preferably be followed. However, when the storage system is not interfaced with any other equipment, it is not necessary to leave the two entry level storage cells vacant. In that event, the replacement die can be waiting on the elevator at the entry level. The replacement die can be removed from the storage system and the existing die can then be placed on the elevator and returned to its designated storage cell.

The elevator can be moved in various ways in addition to the preferred embodiment shown in the drawings. For example, hydraulics and a hoist could be used, or a ball screw or a SERAPID (a trade mark) chain could be used to lift the elevator.

Instead of the cam followers being located at each corner of the elevator and rotating on a machined metal plate affixed to the interior pillars, slideways or pistons sliding in cylinders could be used to guide the elevator. The transfer means is preferably one or more one way rigid chain units or one or more ball screws. The grippings means is preferably a gripper or a pop-up latch.

As the system for storing dies and the like of the present invention is fully automated, the control means can be one or more programmable logic controllers. The system can stand alone or it can interface with independent equipment through the use of sensors. Preferably, sensors 170 (see FIG. 2) attached to one of the interior pillars 40 senses when the elevator 12 has been lifted or lowered to within one-half inch to one inch above the storage level desired. The four retention pins on the sides of the elevator are then extended and the elevator is lowered automatically until these pins rest on the corresponding brackets on the interior pillars. There is one sensor 170 for each of the desired stops of the elevator 12.

Through the use of the programmable controllers, the storage location of each die can be programmed into memory. An operator has only to input an identification number for a particular die along with the appropriate command and that die can be automatically stored or retrieved. The usage of the die can also be monitored by the system and this information can be provided to a tool room for die maintenance.

The system of the present invention transfers dies to and from storage in a smooth and gentle manner, thereby greatly reducing the possibility of the dies being damaged. The system can accommodate multiple die sizes in one storage system either by using die extensions or by programming the programmable controllers.

Numerous variations, within the scope of the attached claims, can be made to the invention. Various components can be activated hydraulically or pneumatically. For example, two or more additional columns can be located to the rear of the existing two columns. Additional columns can be serviced by one elevator or one self-contained two column unit with its own elevator could be placed behind another self-contained unit and the elevator from one unit could transfer or retrieve dies by a transfer made between the two elevators. An elevator can be sized to support two dies simultaneously, for example, an existing die and a replacement die.

What we claim as our invention is:

1. A system for storing dies, said system having a plurality of die storage cells arranged vertically in a column, with an elevator mounted adjacent to said column, each storage cell being sized to store a die and having roller means, which comprise first guide and transport means thereon, so that a die can either be placed in or removed from each cell, said elevator having a front, a rear and two sides and being connected to move vertically relative to said column, with power means to move the elevator vertically, said system being characterized by said elevator having a lift table with second guide means and third guide means and second transport means thereon, said second transport means permitting said die to move on said lift table, said second guide means arranged to guide said die as it moves from side to side on said elevator, said third guide means being arranged to guide said die as it moves from front to rear on said elevator, with first transfer means mounted on said system to transfer a die from side to side along said second guide means to or from said storage cell, said second guide means and said third guide means being connected to be independently extendable and retractable, and control means to store or remove a die on or from a particular storage cell and to receive or remove a die on or from said elevator, said control means extending said second guide means while said third guide means is retracted when moving a die from side to side, said control means extending said third guide means while said second guide means is retracted when moving a die from front to rear and vice-versa, said control means extending both said second and third guide means to lock a die in position on said elevator, said column and said elevator being a self-contained unit.

2. A system for storing dies as claimed in claim 1 wherein the system is used in conjunction with a press, said system having a bridge extending between said elevator and said press, said bridge having fourth guide means and transport means thereon so that a die can be transferred between said elevator and said press along said bridge.

3. A system for storing dies as claimed in claim 1 wherein the first guide and transport means in each storage cell are a first set of V-rollers that are oriented to move the die to or from the elevator, with a mechanical stop being positioned in each storage cell to prevent the die from inadvertently rolling out of the cell, each V-roller being shaped to fit within a corresponding channel on said die.

4. A system for storing dies as claimed in claim 3 wherein said second guide means and said second transport means on the elevator comprise a set of ball rollers and second set of V-rollers, said ball rollers being capable of supporting a die and permitting rolling in any direction, said ball rollers comprising said second transport means, said second set of V-rollers being mounted to guide a die from side to side and said third guide means being a third set of V-rollers that are mounted to guide a die from front to rear and vice-versa, each of said second set of V-rollers and said third set of V-rollers being mounted so that each set is extendable and retractable by extension and retraction means so that when one of said second and third sets is extended and the other of said second and third sets is retracted, a die can be moved onto or removed from the elevator in an appropriate direction and so that when both of said second and third sets are extended, said second and third set of V-rollers comprise locking means so that a die can be locked in position on said elevator.

5. A system for storing dies as claimed in claim 4 wherein there are wedge pins in each of said storage cells that are connected to be controlled by said control means to extend to a die when a die is in the storage cell and is desired to be locked in position and to retract from a die when a die is in said storage cell and is desired to be removed from or placed into said storage cell.

6. A system for storing dies as claimed in claim 5 wherein the elevator has four corners and there are two columns of said storage cells including said column of claim 1, one of said columns being located on each side of said elevator, each of said columns having four pillars, two exterior pillars and two interior pillars, one of said pillars being located at each of said corners of the elevator, each of said corners of said elevator having a vertical guiding mechanism, said mechanism being a bracket which surrounds each of said interior pillars adjacent to said corner of said elevator, there being two cam followers mounted on each said bracket, said cam followers rotating on a machined steel plate on each of said pillars as said elevator moves vertically.

7. A system for storing dies as claimed in claim 4 wherein said second and third sets of V-rollers on the elevator are extended and retracted hydraulically.

8. A system for storing dies as claimed in claim 4 wherein said second and third sets of V-rollers on the elevator are extended and retracted pneumatically.

9. A system for storing dies as claimed in claim 1 wherein the first transfer means is mounted on said elevator and there is a second transfer means mounted on said system to transfer a die from front to rear along said third guide means and vice-versa.

10. A system for storing dies as claimed in claim 1 wherein the first transfer means has one ball screw across said elevator, said ball screw being fitted with gripping means for gripping the die.

11. A system for storing dies as claimed in claim 10 wherein the gripping means comprise air cylinders.

12. A system for storing dies as claimed in claim 9 wherein the second transfer means is at least one one way rigid chain unit.

13. A system for storing dies as claimed in claim 1 wherein the control means is a programmable logic controller.

14. A system for storing dies as claimed in claim 6 wherein there are four retention pins, one pin on each said corner of the elevator, said pins being shaped and located to abut storage cell brackets being located at each of said storage cells on said interior pillars when said pins are extended, said pins being retractable so that they will not abut said storage cell brackets.

15. A system for storing dies as claimed in claim 14 wherein the retention pins are extended or retracted hydraulically.

16. A system for storing dies as claimed in claim 14 wherein the retention pins are extended or retracted pneumatically.

17. A system for storing dies as claimed in claim 1 wherein the power means is a motor located above the elevator at a sufficient height that the motor is above an uppermost storage cell of the column, said motor being affixed to a cable to move the elevator upward and downward.

18. A system for storing dies as claimed in claim 17 further comprising a sensor on said elevator, said sensor being connected to said control means, said control means comprising means for stopping said power means when said elevator is within one-half inch to one inch above the particular storage cell to which said elevator is moving, said elevator having four retention pins mounted on a side of said elevator, said retention pins being extendable and retractable, said pins being shaped and located to abut storage cell brackets being located at each of said storage cells when said Pins are extended, the four retention pins on the sides of said elevator then being extended and said elevator then automatically being lowered until these retention pins rest on the storage cell brackets of said particular storage cell to which said elevator is moving.

* * * * *